(12) United States Patent
Almeida et al.

(10) Patent No.: US 8,086,705 B2
(45) Date of Patent: Dec. 27, 2011

(54) PEER-TO-PEER MODULE CONFIGURATION REDUNDANCY AND RECOVERY MANAGEMENT

(75) Inventors: Jason R. Almeida, Raleigh, NC (US); William G. Pagan, Durham, NC (US); Marc V. Stracuzza, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 12/253,070

(22) Filed: Oct. 16, 2008

(65) Prior Publication Data

US 2010/0100612 A1    Apr. 22, 2010

(51) Int. Cl.
G06F 15/177    (2006.01)
G06F 11/00    (2006.01)

(52) U.S. Cl. ............................ 709/221; 709/220; 714/15

(58) Field of Classification Search .......... 709/220–222, 709/223–224, 213–216; 707/202, 674–676, 707/204, 999.202, 999.204; 714/2, 15, 20, 714/E11.007, 4, 6
See application file for complete search history.

(56) References Cited

U.S. PATENT DOCUMENTS 6,205,449 B1    3/2001    Rastogi et al.
2002/0112196 A1    8/2002    Datta et al.
2002/0188426 A1    12/2002    Datta et al.
2004/0255186 A1    12/2004    Lau
2006/0271601 A1*    11/2006    Fatula et al. .................. 707/201
2007/0073733 A1*    3/2007    Matthews et al. ............... 707/10

OTHER PUBLICATIONS

Rajagopal, Ananda; "NetIron XMR Architecture Brief"; Version 2.5; Foundry Networks, Inc.; 2005.

* cited by examiner

*Primary Examiner* — Peling Shaw
(74) *Attorney, Agent, or Firm* — Steven M. Greenberg, Esq.; Carey, Rodriguez, Greenberg & O'Keefe

(57) ABSTRACT

A method for peer-to-peer management module configuration redundancy and recovery can be provided. The method can include fragmenting configuration data for a specified management module configured to manage systems components in a blade environment. The method also can include identifying peer management modules communicatively connected to the specified management module. The method yet further can include transmitting different ones of the fragmented configuration data to different ones of the peer management modules. In response to a reset condition in the specified management module, the method can provide for the retrieval of the fragmented configuration data from the peer management modules. Thereafter, the method can provide for the re-assembly of the retrieved fragmented configuration data and the application of the re-assembled fragmented configuration data to the specified management module.

20 Claims, 2 Drawing Sheets

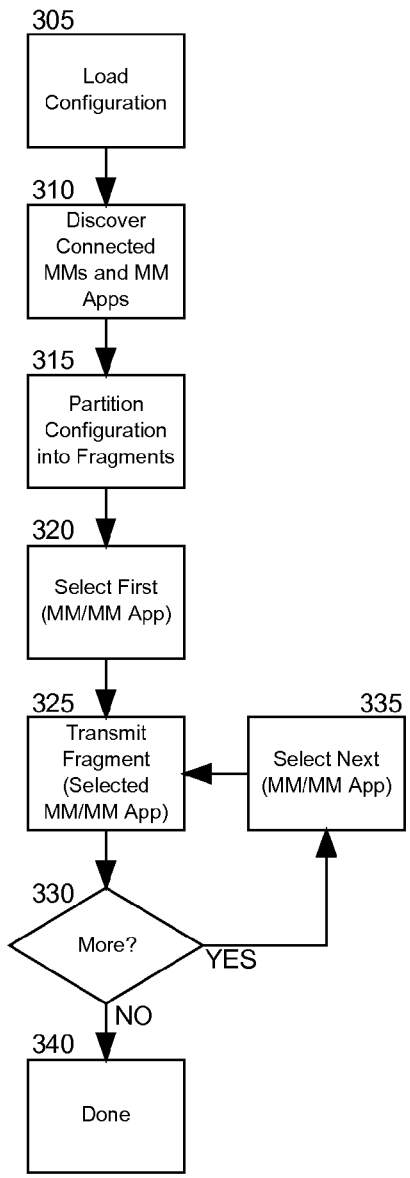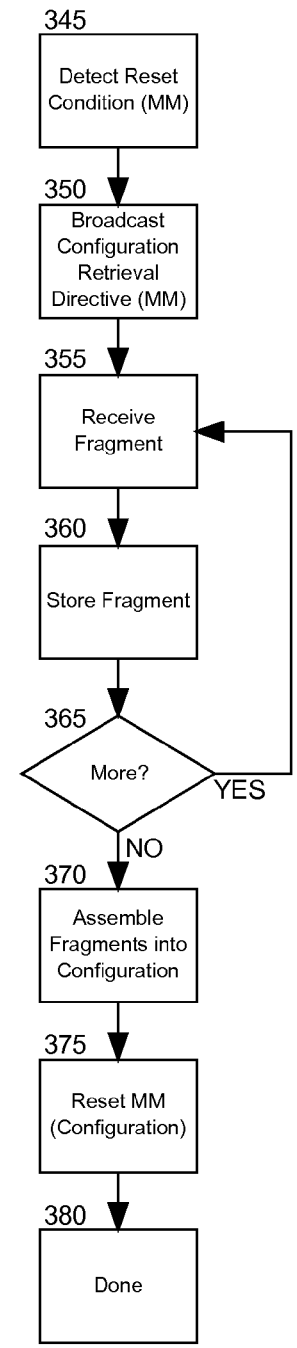
FIG. 3A
FIG. 3B

PEER-TO-PEER MODULE CONFIGURATION REDUNDANCY AND RECOVERY MANAGEMENT

BACKGROUND OF THE INVENTION

1. Field of the Invention

The present invention relates to the field of management modules for a server system and more particularly to management module redundancy for a server system.

2. Description of the Related Art

The data center has changed over time from a mainframe centric environment requiring dozens of skilled technologists to ensure the ongoing operation of the mainframe, to a complex environment of many different server computing platforms coupled to one another over sophisticated data communications networks. Initially a resource only available to the wealthiest of organizations, recent advances in the mass production of personal computers has provided access to data center technologies at a reasonable cost. Generally facilitated by a rack, the modern data center involves the arrangement of a multiplicity of servers in one or more racks coupled together according to conventional network protocols.

Addressing the unwieldy and unreliable nature of rack-mounted ordinary computers, blade server solutions have become pervasive in more sophisticated data centers. In the blade center environment, different computing platforms can be arranged into blades and coupled to one another across a mid-plane in a single chassis. The mid-plane can provide access to a unified power source, input output (I/O) devices and even removable media drives. In this way, the blades need not include or manage a power supply or commonly used drives within the blades themselves resulting in substantial power savings, a reduced footprint and overall lower total cost of ownership. Additionally, failover concerns can be met through the hot-swappable nature of the blades in the chassis.

Unlike the basic standalone server computing platform, an arrangement of servers in a data center environment—including blade server arrangements—presents a management challenge for information technologists. Each server in the data center environment can have its own configuration to support a unique blend of application components and thus, each configuration for each server must be managed carefully and remotely in many cases. Further, failover contingencies must be addressed within each server including notification of an impending or already occurrence of a system fault in a server.

The complexity of managing the configuration of an arrangement of servers in the data center has been addressed by way of the management module. A management module generally provides system monitoring, diagnostics, telemetry and other services for a given computing domain. That computing domain can be at the device, system, chassis or data-center level, by way of example. A baseboard management controller (BMC) can cooperate with a management module as a built-in system component that provides basic monitoring and troubleshooting facilities for a host server, such as sending alerts and remote power control. The BMC is commonly associated with high-performance server and refers to a microcontroller configured for the out-of-band management of system fault handling. Modern BMC implementations include a configuration for scanning out all error registers during system failure before resetting the system. Some BMC implementations only are able to scan out chipset registers as processor registers for some central processing unit (CPU) models are not accessible. Other BMC implementations are able to scan out both chipset registers and processor registers.

Ironically, while management modules are charged with monitoring the health of a monitored server, management modules in of themselves are susceptible to failure. Configuring a management module for proper interoperation with a monitored server can be complicated and the loss of a management module can require a tedious manual reconfiguration of the management module. To address the possibility of a failure in a management module, at present, redundancy in management modules is provided within the chassis of a server. However, in space constrained environments like the blade server environment, hardware space comes at an expensive premium so that it is preferable to reduce components in a blade server environment to optimize total cost of ownership of the environment.

BRIEF SUMMARY OF THE INVENTION

Embodiments of the present invention address deficiencies of the art in respect to management module redundancy and provide a novel and non-obvious method, system and computer program product for peer-to-peer management module configuration redundancy and recovery. In an embodiment of the invention, a method for peer-to-peer management module configuration redundancy and recovery can be provided. The method can include fragmenting configuration data for a specified management module configured to manage systems components in a data center environment, such as a blade server environment though the invention is not viewed to be limited to blade center environments and other clusters of computing hosts are contemplated to fall within the scope of the invention as described herein. The method also can include identifying peer management modules communicatively connected to the specified management module. The method yet further can include transmitting different ones of the fragmented configuration data to different ones of the peer management modules.

Notably, in response to a reset condition in the specified management module, the method can provide for the retrieval of the fragmented configuration data from the peer management modules. Thereafter, the method can provide for the re-assembly of the retrieved fragmented configuration data and the application of the re-assembled fragmented configuration data to the specified management module. In this way, the specified management module can be re-configured subsequent to a loss of configuration data without involving a tedious manual reconfiguration. However, multiple redundant management modules within a single server need not be provided (thereby avoiding the space constraints of servers such as blade servers) as the redundancy of peer management modules can be leveraged.

In another embodiment of the invention, a data center data processing system can be provided. The system can include multiple different servers, for example blade servers, communicatively coupled to one another over a computer communications network. The system also can include a management module disposed in each of the servers. Each management module can include configuration data configuring the management module for operation in a corresponding one of the servers. Further, each management module can manage at least one BMC. Finally, redundancy logic can be coupled to each of the management modules.

The redundancy logic can include program code enabled to fragment the configuration data for a corresponding management module. The program code of the redundancy logic also can be enabled to identify peer management modules communicatively connected to the corresponding management module and to transmit different ones of the fragmented configuration data to different ones of the peer management modules. Finally, in response to a reset condition in the specified management module, the program code of the redundancy logic can be enabled to retrieve the fragmented configuration data from the peer management modules, to re-assemble the retrieved fragmented configuration data and to apply the re-assembled fragmented configuration data to the specified management module.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for peer-to-peer management module configuration redundancy and recovery. In accordance with an embodiment of the present invention, configuration data for a management module can be fragmented and distributed to peer management modules in a cluster. In particular, communicatively coupled peer management modules and optionally, management applications interacting with the peer management modules, can be identified. Thereafter, the configuration data can be fragmented to account for the identified management modules (and optionally the management applications) and transmitted individually for storage in the identified peer management modules (and optionally the management applications). In the event that a retrieval of the configuration is required, for example, in consequence of a resetting of the management module to factory default settings, a broadcast message can be provided to the peer management modules (and optionally the management applications) in order to retrieve the fragments. Finally, the fragments can be reassembled into the configuration data and the configuration data can be applied to the management module.

Figure 1:
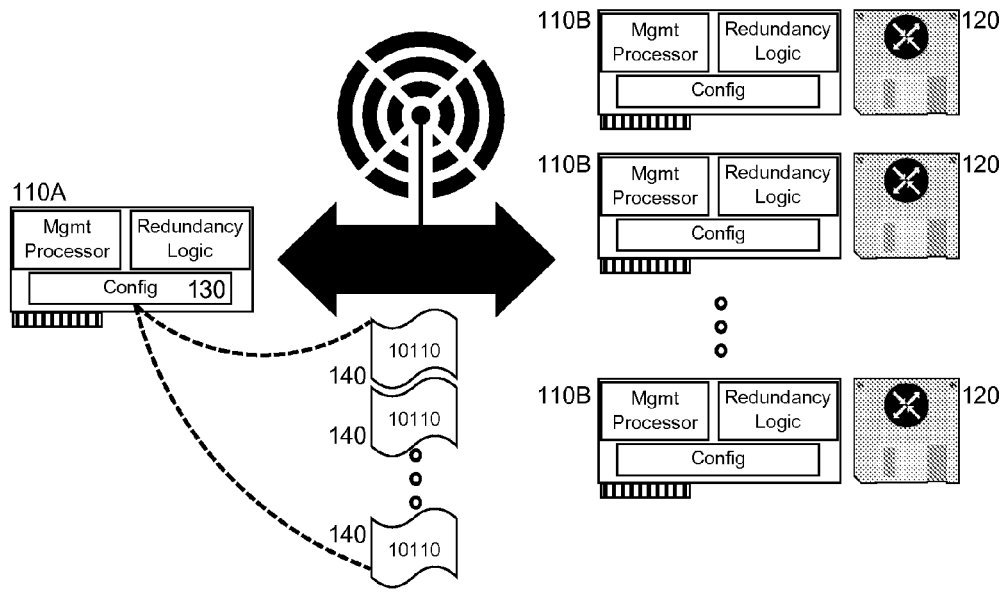
FIG. 1 is a pictorial illustration of a process for peer-to-peer management module configuration redundancy and recovery.

In illustration, FIG. 1 pictorially depicts a process for peer-to-peer management module configuration redundancy and recovery. As shown in FIG. 1, a management module 110A can include configuration data 130, for example in the form of a configuration file. Multiple different communicatively coupled management modules 110B and corresponding management applications 120 can be identified to store fragments 140 of the configuration data 130. The different management modules 110B can be arranged in a hierarchy of management modules 110B with the management module 110A acting as a root node and thus a super node to the management modules 110B. Selected ones of the management modules 110B can act as parent nodes to one or more other ones of the management modules 110B and remaining ones of the management modules 110B can be leaf nodes in the hierarchy.

The configuration data 130 can be partitioned into fragments 140. Thereafter, different ones of the fragments 140 can be transmitted for storage in different ones of the management modules 110B and corresponding management applications 120. When required, a broadcast message can be provided to the management modules 110B and the corresponding management applications 120 to retrieve the fragments 140 for reconstruction into the configuration data 130. In this way, the configuration data 130 can be redundantly stored across a hierarchy of management modules 110B while eliminating the need to consume space within a blade server environment where consuming space can be expensive and undesirable.

Figure 2:
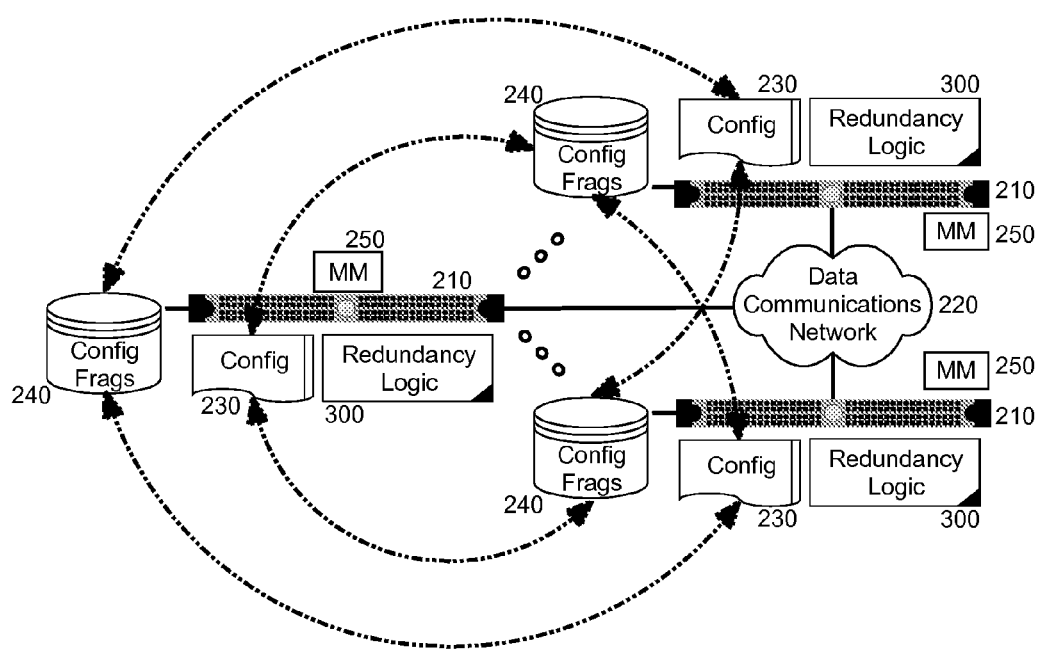
FIG. 2 is a schematic illustration of a data center configured for peer-to-peer management module configuration redundancy and recovery; and, FIGS. 3A and 3B, taken together, are a flow chart illustrating a process for peer-to-peer management module configuration redundancy and recovery.

In further illustration, FIG. 2 schematically shows a data center configured for peer-to-peer management module configuration redundancy and recovery. The data center can be a data processing system of multiple different servers, such as blade servers 210 communicatively linked to one another over a computer communications network 220. Each of the servers 210 can include a management module 250 for instance a BMC. The management module 250 can be configured according to configuration data 230. Notably, each of the servers 210 also can include a data store of configuration data fragments 240 storing configuration data fragments of others of the management modules 250 for others of the servers 210. Further, each of the servers 210 can include redundancy logic 300 coupled to the data store of configuration data fragments 240 and also to the configuration data 230 for a corresponding one of the servers 210.

The redundancy logic 300 can include program code enabled to determine communicative connectivity with other ones of the management modules 250 for other ones of the servers 210. The program code further can be enabled to fragment corresponding configuration data 230 into fragments for transmission to the other management modules 250 determined to be communicatively connected for storage therein in corresponding ones of the data store of configuration data fragments 240. Yet further, the program code can be enabled to broadcast a request to the management modules 250 to retrieve the fragments 240 when required in order to reconstruct the configuration data 230.

In yet further illustration of the operation of the program code of the redundancy logic 300, FIGS. 3A and 3B, taken together, are a flow chart illustrating a process for peer-to-peer management module configuration redundancy and recovery. Beginning in block 305 of FIG. 3A, configuration data for the management module can be loaded and in block 310, other, communicatively connected management modules (and optionally management applications) can be identified, for example through broadcast discovery. In block 315, the configuration data can be partitioned for distribution amongst the identified management modules.

In block 320, a first of the identified management modules (or optionally management applications) can be selected to receive one or more of the fragments and in block 325, one or more of the fragments can be transmitted to the selected management module (or management application) for storage in connection with the selected management module (or management application). In decision block 320, if additional management modules (or management applications) remain, in block 335 a next management module (or management application) can be selected to receive remaining fragments. Otherwise, the process can end in block 340.

Turning now to FIG. 3B, in block 345 a reset condition can be detected in the management module in that a default configuration is applied. The reset condition can result from a manual reset of the management module, or a failure condition in the management module. Irrespective of the impetus for the reset condition, in block 350, a configuration retrieval request can be broadcast to the other communicatively connected management modules (and optionally the management applications). Though not shown in connection with FIG. 3B, each management module or management application receiving the broadcast request can determine whether or not fragments have been stored in connection with a management module identified in the broadcast request. If so, the fragments can be transmitted to the requesting management module.

In block 355, a fragment can be received from a communicatively connected management module (or optionally a management application). In block 360 the received fragment can be stored and if additional fragments are yet to be received as determined in decision block 365, additional fragments can be received in block 355 and so forth. In decision block 365, when all fragments have been received, in block 370 the fragments as stored can be assembled into the configuration data for the management module. Subsequently, in block 375 the management module can be reset to utilize the configuration data as assembled and the process can end in block 380.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for peer-to-peer management module configuration redundancy and recovery, the method comprising:
    fragmenting configuration data for a specified management module configured to monitor and manage systems components in a data center environment;
    identifying peer management modules communicatively connected to the specified management module;
    transmitting different ones of the fragmented configuration data to different ones of the peer management modules; and,
    responsive to a reset condition in the specified management module,
        retrieving the fragmented configuration data from the peer management modules,
        re-assembling the retrieved fragmented configuration data and
        applying the re-assembled fragmented configuration data to the specified management module.

2. The method of claim 1, wherein
the peer management modules are arranged hierarchically with the specified management module acting as a super-node to the identified peer management modules.

3. The method of claim 1, further comprising
transmitting the different ones of the fragmented configuration data to different management applications utilizing the peer management modules.

4. The method of claim 1, further comprising
broadcasting a request to retrieve the fragmented configuration data to the peer management modules.

5. A data center data processing system, comprising:
    a computer communications network;
    a plurality of servers communicatively coupled to one another over the computer communications network;
    a management module disposed in at least one of the servers, the management module comprising configuration data configuring the management module for operation in a corresponding one of the servers; and
    redundancy logic coupled to each of the management modules, the redundancy logic configured to
        fragment the configuration data for the management module,
        identify peer management modules communicatively connected to the corresponding management module,
        transmit different ones of the fragmented configuration data to different ones of the peer management modules, and
        in response to a reset condition in a specified management module,
            retrieve the fragmented configuration data from the peer management modules, to
            re-assemble the retrieved fragmented configuration data and
            apply the re-assembled fragmented configuration data to the specified management module.

6. The system of claim 5, further comprising
a baseboard management controller (BMC) in a corresponding one of the servers, the management module managing the BMC.

7. The system of claim 5, wherein
the servers are blade servers.

8. A computer program product comprising a computer usable storage medium having stored therein computer usable program code for peer-to-peer management module configuration redundancy and recovery, the computer usable program code, which when executed by a computer hardware system, causes the computer hardware system to perform
    fragmenting configuration data for a specified management module configured to monitor and manage systems components in a data center environment;
    identifying peer management modules communicatively connected to the specified management module;
    transmitting different ones of the fragmented configuration data to different ones of the peer management modules; and
    responsive to a reset condition in the specified module,
        retrieving the fragmented configuration data from the peer management modules,
        re-assembling the retrieved fragmented configuration data and
        applying the re-assembled fragmented configuration data to the specified management module.

9. The computer program product of claim 8, wherein
the peer management modules are arranged hierarchically with the specified management module acting as a super-node to the identified peer management modules.

10. The computer program product of claim 8, wherein
transmitting the different ones of the fragmented configuration data to different management applications utilizing the peer management modules.

11. The computer program product of claim 8, further comprising
broadcasting a request to retrieve the fragmented configuration data to the peer management modules.

12. The method of claim 1, wherein
the specified management module and the peer management modules are respectively disposed in different blade servers within a blade center.

13. The method of claim 12, wherein
the transmitting is performed over a midplane of the blade center.

14. The method of claim 1, wherein
the applying includes configuring the specified management module with the re-assembled configuration data.

15. The system of claim 5, wherein
the computer communications network is a midplane.

16. The system of claim 5, wherein
the redundancy logic is further configured to configure the specified management module with the re-assembled configuration data.

17. The computer program product of claim 8, wherein
the computer hardware system is a blade center.

18. The computer program product of claim 17, wherein
the specified management module and the peer management modules are respectively disposed in different blade servers within the blade center.

19. The computer program product of claim 18, wherein
the transmitting is performed over a midplane of the blade center.

20. The computer program product of claim 8, wherein the applying includes configuring the specified management module with the re-assembled configuration data.

* * * * *